(12) United States Patent
Wright (10) Patent No.: US 10,692,359 B2
(45) Date of Patent: Jun. 23, 2020

(54) WITNESS REQUEST AND ALERT NOTIFICATION AND TRACKING SYSTEM

(71) Applicant: GREEN LINE BUSINESS GROUP, Newark, DE (US)

(72) Inventor: Anthony D. Wright, Wilmington, DE (US)

(*) Notice: Subject to any disclaimer, the term of this patent is extended or adjusted under 35 U.S.C. 154(b) by 0 days.

(21) Appl. No.: 16/392,586

(22) Filed: Apr. 23, 2019

(65) Prior Publication Data

US 2019/0325733 A1    Oct. 24, 2019

Related U.S. Application Data

(60) Provisional application No. 62/661,425, filed on Apr. 23, 2018.

(51) Int. Cl.
| | |
|---|---|
| *G08B 25/12* | (2006.01) |
| *G08B 25/01* | (2006.01) |
| *G08B 27/00* | (2006.01) |
| *G06F 3/0484* | (2013.01) |
| *H04W 4/029* | (2018.01) |
| *H04W 4/90* | (2018.01) |
| *G06F 3/0482* | (2013.01) |

(52) U.S. Cl.
CPC .......... *G08B 25/12* (2013.01); *G06F 3/0482* (2013.01); *G06F 3/04847* (2013.01); *G08B 25/014* (2013.01); *G08B 25/016* (2013.01); *G08B 27/001* (2013.01); *G08B 27/006* (2013.01); *H04W 4/029* (2018.02); *H04W 4/90* (2018.02)

(58) Field of Classification Search
CPC .... G08B 25/12; G08B 25/014; G08B 25/016; G08B 27/001; G08B 27/006; H04W 4/029; H04W 4/90; G06F 3/0482; G06F 3/04847

USPC .......................................................... 340/540
See application file for complete search history.

(56) References Cited

U.S. PATENT DOCUMENTS

| | | |
|---|---|---|
| 6,882,837 B2 | 4/2005 | Fernandez et al. |
| 7,098,787 B2 | 8/2006 | Miller |
| 7,406,507 B2 | 7/2008 | Piccioni |
| 8,024,330 B1 | 9/2011 | Fanco et al. |
| 8,306,503 B2 | 11/2012 | Morrison |
| 8,359,048 B2 | 1/2013 | Riley et al. |
| 8,538,374 B1 | 9/2013 | Haimo et al. |
| 8,831,634 B2 | 9/2014 | Wang |

(Continued)

FOREIGN PATENT DOCUMENTS

WO    2018045400 A1    3/2018

*Primary Examiner* — Omar Casillashernandez
(74) *Attorney, Agent, or Firm* — Devlin Law Firm LLC; James M. Lennon (57) ABSTRACT

A witness request and alert notification and tracking system provides users the ability to notify other users of an alert event, such as a fire, or request a witness to an event, such as an altercation or protest. An alert event may be an emergency situation that users may be warned to avoid and a witness request may request users to come to an event location. A witness request event may be an event that the posting user wants documentation of, such as an altercation. A witness request may be an event wherein the posting user wants assistance and/or protection. The system enables a user to set an area range for the post and users within the range will receive the post. Other users can then add to the event log with text, pictures or videos. The system utilizes global positioning systems to track the location of the users.

20 Claims, 9 Drawing Sheets

(56) References Cited

U.S. PATENT DOCUMENTS

| | | | |
|---|---|---|---|
| 9,232,040 B2 * | 1/2016 | Barash | G16H 40/20 |
| 9,232,062 B2 | 1/2016 | Dickinson et al. | |
| 9,294,900 B2 | 3/2016 | Pahlevani | |
| 10,012,719 B2 * | 7/2018 | Meredith | G01S 5/0072 |
| 10,104,536 B2 | 10/2018 | Ryan et al. | |
| 10,230,827 B2 | 3/2019 | DiPerna et al. | |
| 2009/0281850 A1 | 11/2009 | Bruce et al. | |
| 2013/0005294 A1 * | 1/2013 | Levinson | H04N 7/18 |
| | | | 455/404.2 |
| 2013/0214925 A1 * | 8/2013 | Weiss | G08B 25/001 |
| | | | 340/539.11 |
| 2014/0304582 A1 | 10/2014 | Bills et al. | |
| 2014/0368601 A1 * | 12/2014 | deCharms | H04W 4/021 |
| | | | 348/14.02 |
| 2015/0038109 A1 | 2/2015 | Salahshour | |
| 2015/0098553 A1 | 4/2015 | Bonitati | |
| 2015/0172897 A1 * | 6/2015 | Mariathasan | H04M 1/72527 |
| | | | 455/404.1 |
| 2016/0029195 A1 | 1/2016 | Leahy et al. | |
| 2016/0112843 A1 | 4/2016 | Dickinson | |
| 2016/0183074 A1 | 6/2016 | Pahlevani | |
| 2016/0353266 A1 * | 12/2016 | Winkler | H04W 4/90 |
| 2017/0041743 A1 | 2/2017 | Artzt et al. | |
| 2017/0124853 A1 * | 5/2017 | Mehta | H04M 1/72536 |
| 2018/0233016 A1 | 8/2018 | Daniel et al. | |
| 2018/0261025 A1 * | 9/2018 | Kerning | G07C 9/00563 |
| 2019/0325733 A1 * | 10/2019 | Wright | G08B 27/006 |

* cited by examiner

WITNESS REQUEST AND ALERT NOTIFICATION AND TRACKING SYSTEM

CROSS REFERENCE TO RELATED APPLICATIONS

This application claims the benefit of priority to U.S. Provisional Patent Application No. 62/661,425, filed on Apr. 23, 2018; the entirety of which is hereby incorporated by reference herein.

FIELD OF THE INVENTION

The invention relates to a witness request and alert notification and tracking system.

BACKGROUND

Means of communication have increased dramatically in recent decades. Some events require posting an alert to warn the public to stay away or evacuate an area while other situations may be a request for the public to attend for documentation purposes or assisting another person. There exists a need to both post or announce an alert and request responders.

SUMMARY OF THE INVENTION

The invention is directed to a witness request and alert notification and tracking system that is configured for people to access through an electronic device, such as a mobile phone. The system enables a person to post either an alert of an event that the other subscribers or users of the system might want to avoid and also a witness request, wherein the posting user requests other subscribers to come to a witness event location. An alert event may be an emergency situation, such as a dangerous or hazardous situation including, but not limited to, a fire, a chemical spill, a riot or protest, a flood and the like. These alert events may place people in danger if they are in close proximity. A witness request event may be an event that the posting subscriber or user of the system encourages other subscribers to attend. A witness request event may be an event that the posting user wants documentation of, such as an altercation, an interaction with law enforcement or other individuals, a flash mob, a promotional event, an entertainment event and the like. A witness request may be an event wherein the posting user wants assistance and/or protection as well, such as walking across campus or from one location to another, and the like.

An exemplary witness request and alert notification and tracking system enables posting of both an alert event and a witness request event through one system. A control program for an electronic device produces separate user inputs for the two types of posts. The home screen of the system may display both types of user posts and the user may select the type of post and input additional information to send out an alert to other users or subscribers to the system. An exemplary witness request and alert notification and tracking system may display a map display on an electronic device and the map display may show the event location, alert or witness request. The map display may also show the location of other subscribers or users of the system. When a person subscribes to the system they may be asked if they consent to displaying their location on the map display. The location of a user may be represented by a generic icon that does not include any personal identifying information, such as name. A posting user may be able to see the number of other subscribers on the map display and this may help them to determine an area range input for the alert or witness request event.

An exemplary witness request and alert notification and tracking system comprises an alert group selection input that allows the event poster to select a group that will receive an alert or witness request. An alert group selection input may include a defined group that is a group defined by the event poster, such as family and friends. The family and friends may have to confirm that they will be part of the group for privacy reasons and to confirm that their icon can be displayed on the event poster's map display. The event poster may define any number of user defined groups that can be selected for an event post. Another group may be a community group, such as a sports team, a church congregation, a Boy Scout group and the like. The members of the community group may confirm that they are part of the group to receive event posts from other members. Each community group may have a director that provides a list of members of the community group and only these members can be added. A public group may be any individuals registered with the witness request and alert notification and tracking system. An exemplary alert group selection input may display a set of concentric rings with the center ring being a user defined group, surrounded by a community group and finally an outer public group. The event poster may select one of the rings such as the community group ring and this may include the members in the community group as well as the user defined group. Likewise, the user may simply select the public group and this would include all public users with the range set including the community group members and defined group members. Alternatively, an event poster may select a specific user defined group or community group from a list to have the event post go out to only these users of the system.

An exemplary witness request and alert notification and tracking system comprises an area range input feature, whereby the posting user sets an area extending around an event location for the system to notify other users. For example, a user may be posting an alert event, such as a fire, and they may set the area range at two miles from the fire. The system will then notify users within two miles of the event location of the fire and they may then be able to avoid this area, or move away from the area depending on the severity of the fire. Likewise, a user posting a witness request may set an area range from the event location. The system may further show or display the number of users within an area range. Therefore, a witness request poster may be able to determine if their area range is large enough to receive a responder to their witness request. An exemplary area range input may include a numerical input and or a sliding bar input to increase or decrease the area range. A range display, such as a circle about the event location may be displayed on the map display, and the poster may be able to see how many user icons and users are within the set area range. In addition, an exemplary witness request and alert notification and tracking system may have a captured user quantity display that shows the number of users within a set range. For witness request posts, this may enable the posting user to set the range to ensure that at least one user will receive the witness request post. An event poster may change the group selection input and area range input to ensure that enough people receive a witness request.

An exemplary witness request and alert notification and tracking system includes an event location input for a posting user to set the event location for the post. The system may have a pin input feature to allow the user to use their current location and global positioning system of the system to automatically set the event location as the location of the electronic device. The posting user may drop a pin and an event icon may be displayed on the map display on their electronic device and when posted, on other users', within the area range, map display of their respective electronic devices. An exemplary witness request and alert notification and tracking system may also have an address input feature for setting the location of an event post. The user may click on the address input and type in or otherwise input an event address. This feature may be useful when the posting user has moved from an event location, such as an alert event as they may have been evacuated or moved to a safer location.

A witness request and alert notification and tracking system further allows the posting user to provide additional event information, such as type of event, description of the event, title for the event and the like. A posting user and other users of the system may post additional information on an event log for the event including text information, pictures and videos. A text post icon may be displayed on a user's electronic device and the user may click on the text post icon to input text information. The system may automatically open a text input field for the user to input information, such as by typing or using a voice to text function, and this information may then be displayed on the event log for the event. A picture post icon may be displayed on a user's electronic device and the user may click on the picture post icon to capture a picture. An exemplary witness request and alert notification and tracking system may automatically open the camera function of the electronic device, such as a mobile phone, and upon capturing a picture, the picture may be posted on the event log. A video post icon may be displayed on a user's electronic device and the user may click on the video post icon to capture a video. An exemplary witness request and alert notification and tracking system may automatically open the video function of the electronic device, such as a mobile phone, and upon capturing a video, the video may be posted on the event log. A user may have to confirm the post before the post is actually posted for other users to view on their electronic device. After inputting text or taking a picture or video the user may have to confirm posting before it is posted for other users to see on the event log.

An exemplary witness request and alert notification and tracking system has a call 911 input feature, such as a 911 display on the electronic device; whereby the user simply clicks on the 911 display feature to automatically dial 911. It is to be understood that some electronic devices may allow this option while others may not. Mobile phones and tablet computers may be configured to make calls and may have proper authorization to enable this automatic call function.

An exemplary witness request and alert notification and tracking system utilizes an internet system to receive and transmit information to the electronic devices of the subscribers. A database may be used to store information that is communicated to the users. A control program is run on a computing device that is coupled with the database and internet to operate the system. The system may have data storage to store all posts and information associated with the posts for later review and dissemination, such as by law enforcement, new agencies and the like.

An electronic device may be a computer, and may be a mobile electronic device such as a mobile phone or mobile computer, such as a tablet computer and the like. An exemplary electronic device comprises a global positioning system (GPS) that the witness request and alert notification and tracking system uses to track their location. The location of the user will be used to determine if they are in the area range for receiving a post of an alert or witness request.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
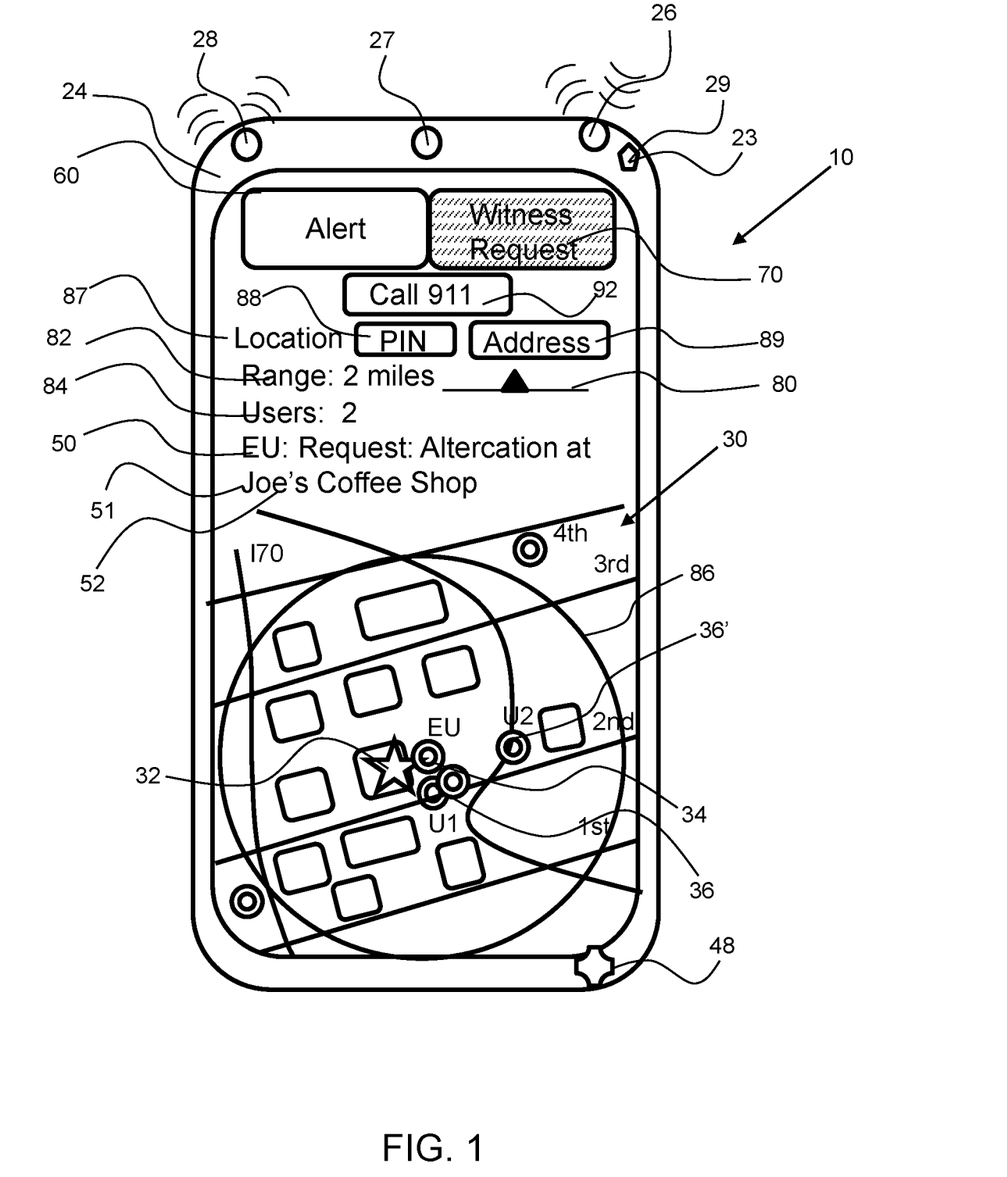
FIG. 1 shows a screen shot of an event poster's mobile device with an exemplary witness request and alert notification app software for initiating a witness request post.

As shown in FIG. 1, an exemplary witness request and alert notification and tracking system 10 comprises a mobile device 22 having a witness request and alert notification app software 23 that enables a user to post an alert or a witness request. As shown in FIG. 1, an event poster's mobile device has posted a witness request event with a range of two miles and a description of the event. The system user may hit the 911 call input feature 92 to automatically call 911 in the event of an emergency type event. An alert input 60 and witness request input 70 enable a user to quickly choose the type of post and alert to send out through the system. These inputs may be touch screen inputs. The event poster, having an event poster icon 34 indicated by the icon and EP, may then choose a location for the event using the event location input 87 that comprises a pin drop input 88 and an address input 89. The user may simply hit the pin input to set the event location as their currently location, determined by the global positioning system (GPS) 48 of their mobile device. Alternatively, the user may input an address, such as when they have moved away from an event location. The event poster may then use the area range input 80 to set a range from the event location for the notification of users within this range. An area range indication 82 may show a range value, and a range display 86 may be produced on the map display 30 showing the range set. An event poster may see the number of active system users 36, 36', indicated by the icons and U1, U2, for example, within a range and use this visual information to make changes to the range. The captured user quantity display 84 shows the number of users within a set range. If the number is zero, the event poster may choose to expand the range, especially in a witness request situation. The event poster may provide an event description input 51, such as a text post 50, to begin the event log 52. The event poster has posted a witness request alert about an altercation at Joe's Coffee Shop with a range of two miles. The mobile phone 24 is a type of mobile device that has a camera 27, a speaker 28, a wireless transceiver 26, a controller 29, such as a microprocessor, that runs a control program or application software and a global positioning system (GPS) 48.

Figure 2:
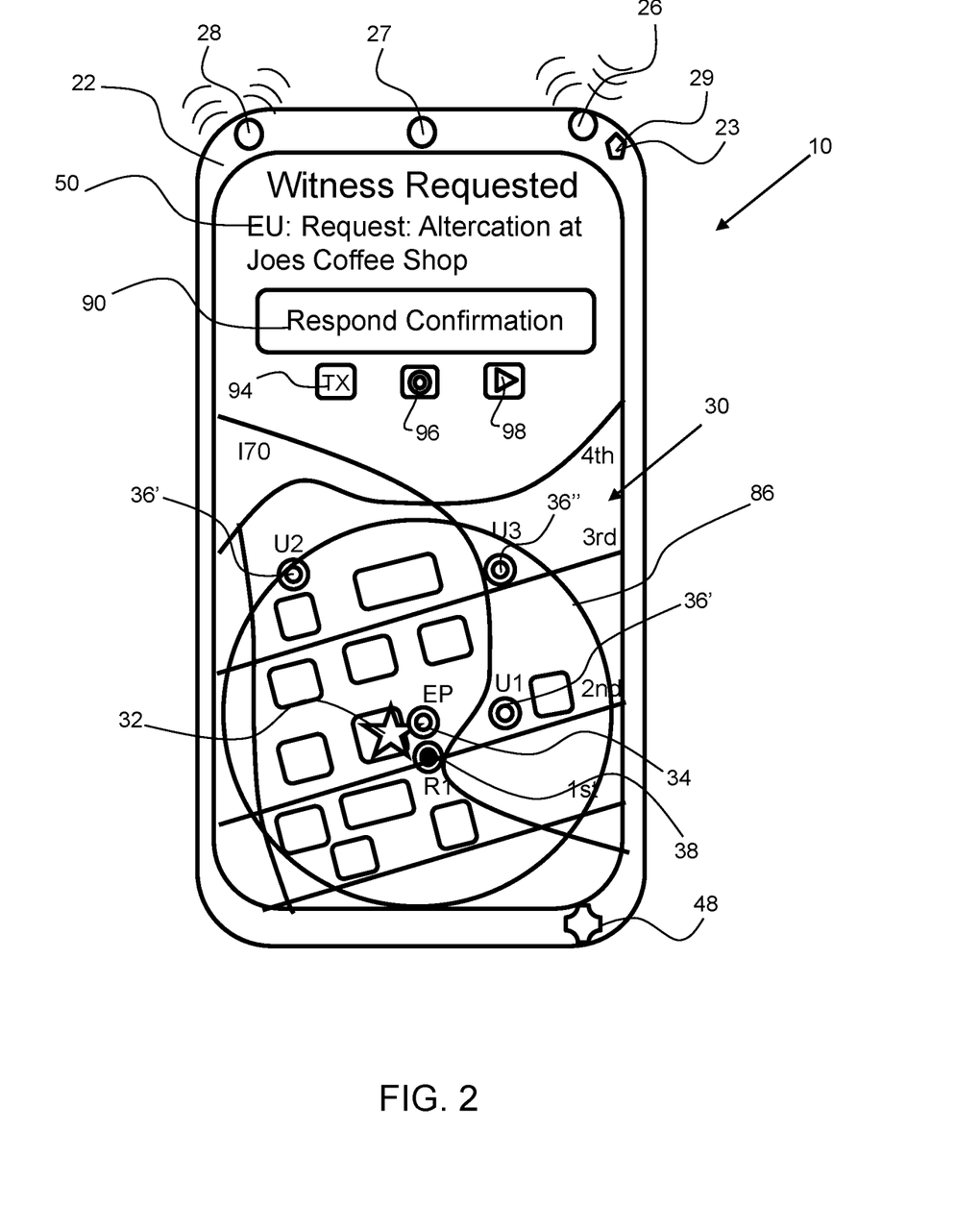
FIG. 2 shows a screen shot of a system responder's mobile device with an exemplary witness request and alert notification app software having a post of a witness requested and a respond confirmation input.

As shown in FIG. 2, a system responder's mobile device 22 has received the witness request alert from the event poster of FIG. 1. The responder has used the responder confirmation input 90 to confirm that they have or are responding to the request. The responder icon 38, indicated by the icon and R1, has changed from the user icon 36 to indicate to the event poster where the responder is with relation to the event location icon 32 on the map display 30. The responder display also has a text post icon 94, picture post icon 96, and video post icon 98 to allow the user to quickly input information to the event log 52 about the event. The user may click on the text post icon 94 to type in a comment about the event, or click on the picture post icon 96 to be directed to the picture mode and whereby taking the picture automatically posts the picture on the event log, after confirmation. Likewise, the user may click on the video post icon 98 to be directed to the video mode of their mobile device 22 whereby taking the video automatically posts the video on the event log, after confirmation.

Figure 3:
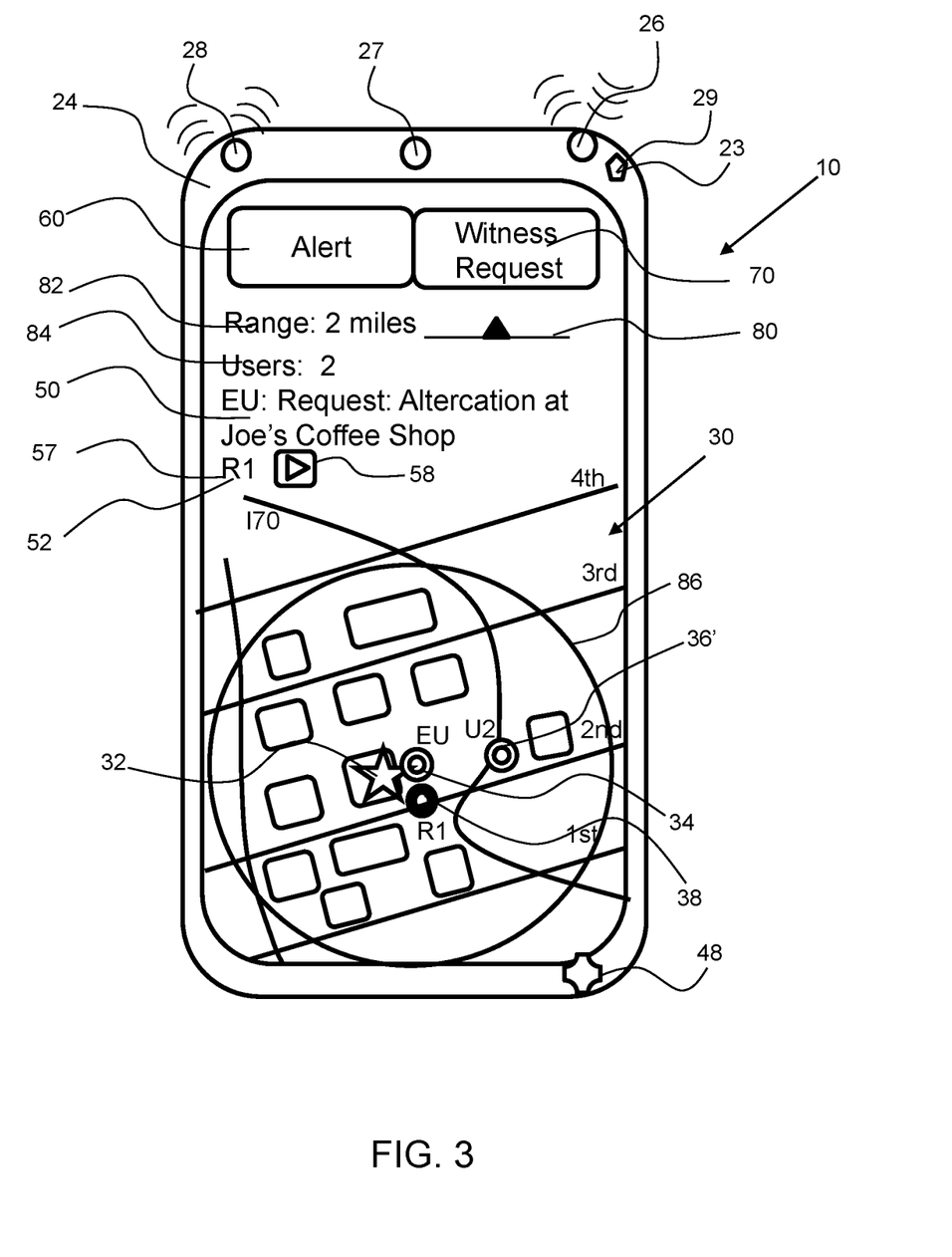
FIG. 3 shows a screen shot of an event poster's mobile device having a responder post of a video and a map of the event location and responder locations.

As shown in FIG. 3, an event poster's mobile phone 24 has a responder's video post 57 on the event log 52 and a map display having the event location icon 32 and the responders' icon 38.

Figure 4:
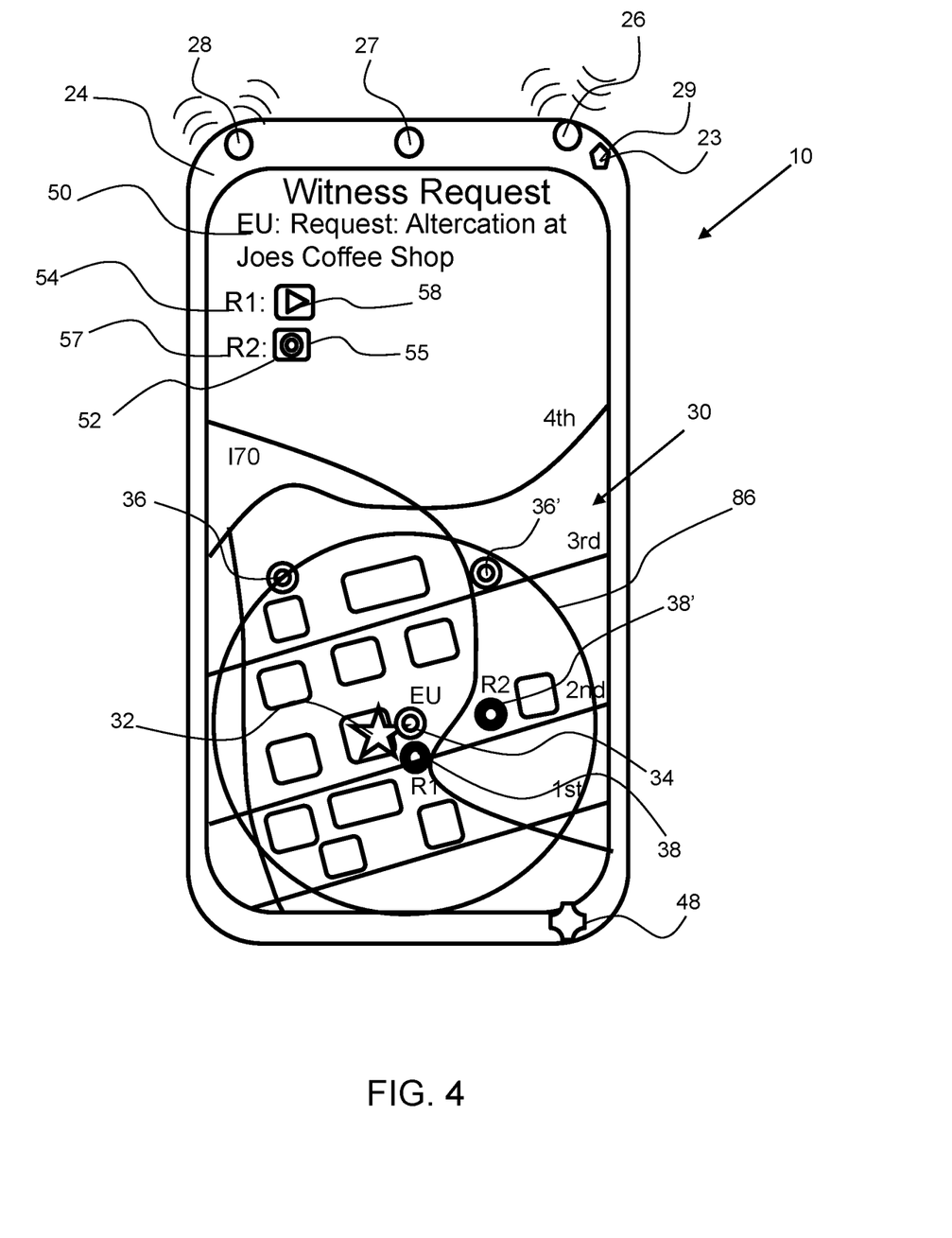
FIG. 4 shows a screen shot of a second system responder's mobile device having said second system responder's picture post added to the event log.

As shown in FIG. 4, a user's mobile device, which may be a responder's mobile phone, has an event log 52 with a video post 57 from responder 1, and a picture post 54 from responder 2. The map display 30 shows the location of both responders 38, 38' with respect to the event location.

Figure 5:
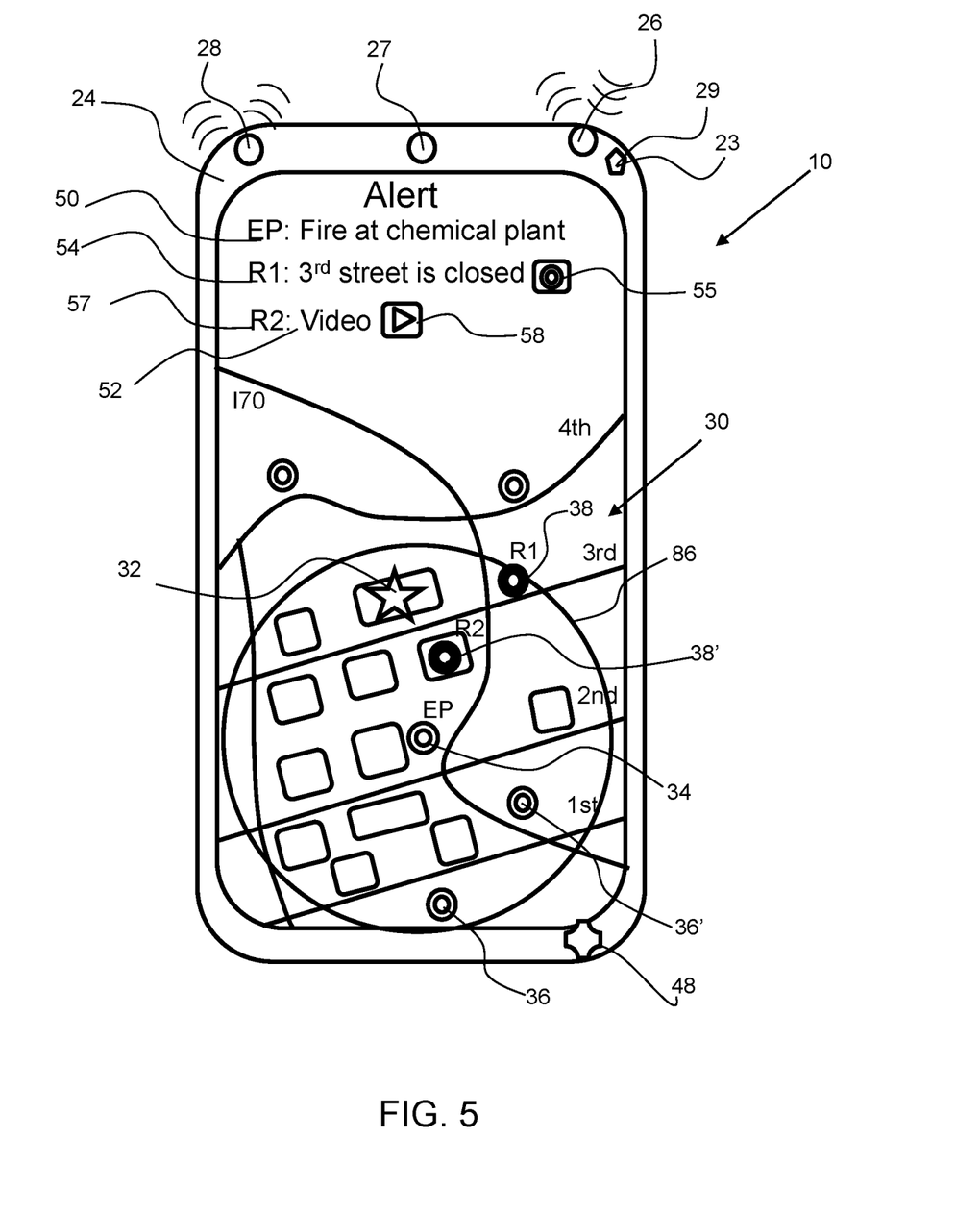
FIG. 5 shows a mobile device with an exemplary witness request and alert notification app software showing the location of an alert event and the location of system responders.
Figure 6:
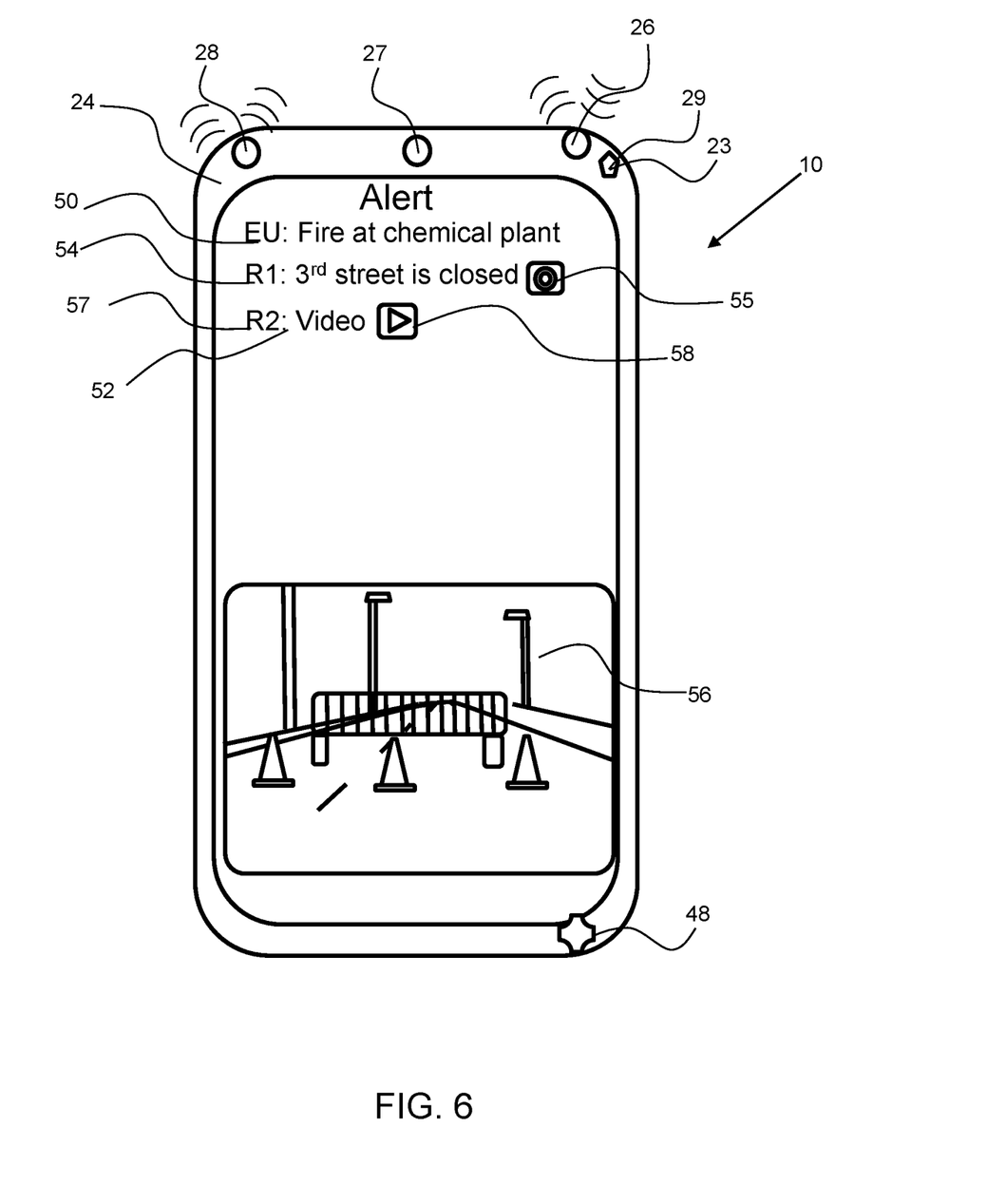
FIG. 6 shows a picture posted by responder 1 showing some details of the alert event.
Figure 7:
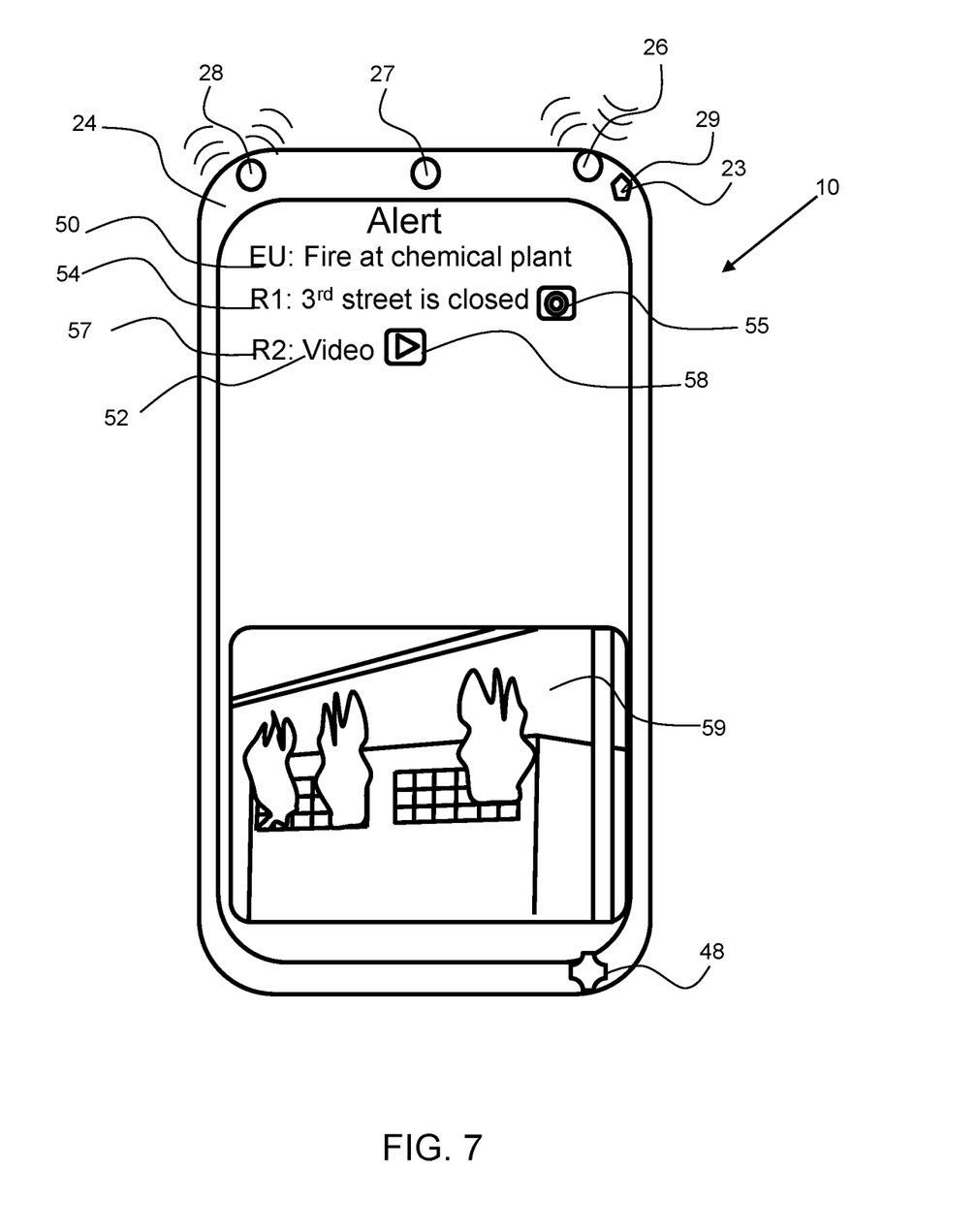
FIG. 7 shows a video posted by responder 2 showing some details of the alert event.

Referring now to FIGS. 5 to 7, a mobile device 22 comprises an exemplary witness request and alert notification app software 23 that produces a map display 30 showing the location of an alert event icon 32, event poster icon 34, and responder icons 38, 38'. The range display 86, the circle on the map, shows the range the event poster selected for this alert post. In an exemplary embodiment, all system users within this range may have received an alert on their mobile device 22. The responder icons 38, 38' show the location of the system users that have responded to the alert post. The shape and/or color of the responder icons 38, 38' may be different from the event poster icon 34 and/or other user icons 36, 36'. The event icon 32 shows the location of the event on the map display 30. A user can quickly determine their proximity to the event by viewing their user icon 36 with respect to the event icon. The event log 52, the list of posts about the alert event, includes a text post 50 of a description of the event that was posted by the event poster. Responder 1 has posted a picture post 54 having a picture link 55 that can be selected to see the picture 56 posted by responder 1, as shown in FIG. 6. Responder 2 has posted a video post 57 having a video link 58 that can be selected to see the video 59 posted by responder 2, as shown in FIG. 7.

Figure 8:
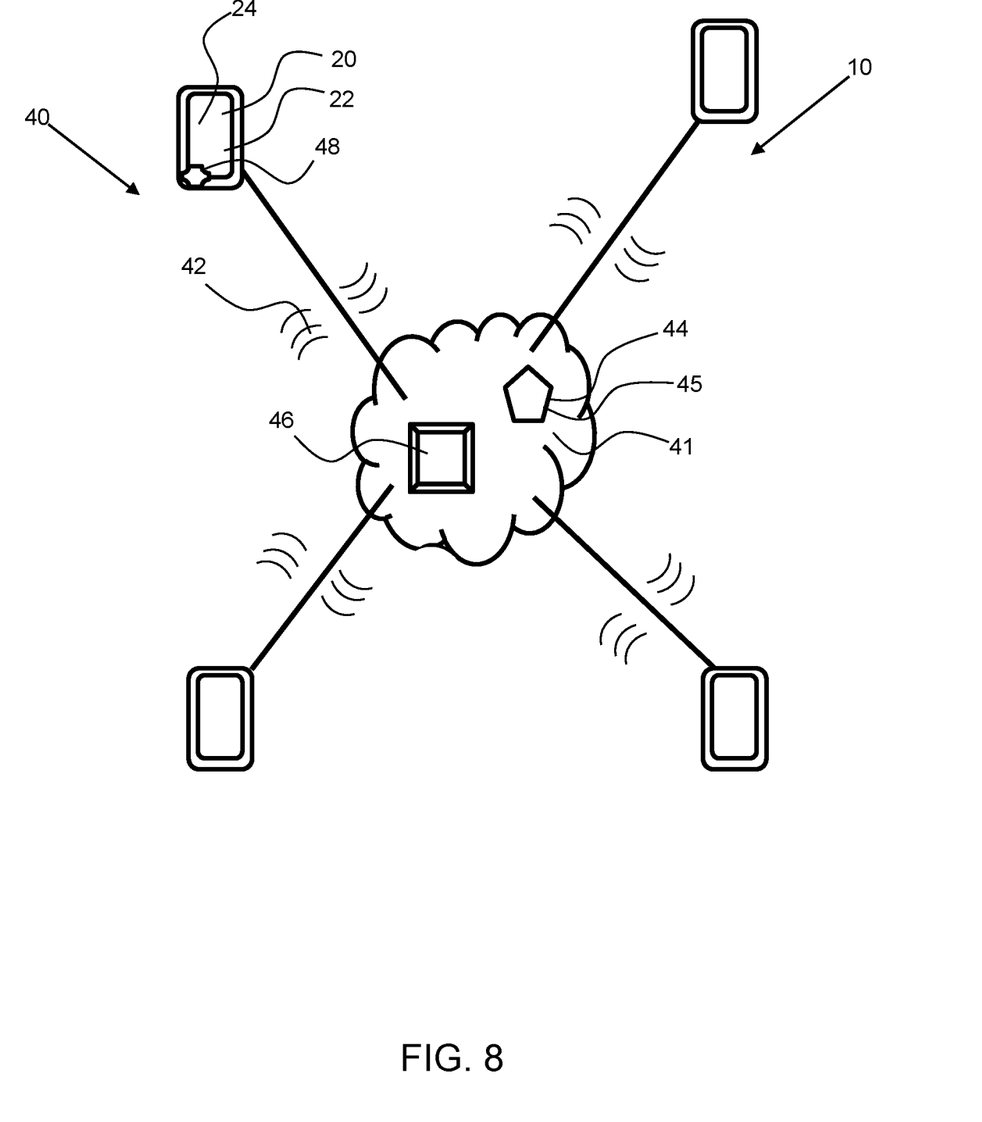
FIG. 8 shows an exemplary internet system comprising a database the is wirelessly connected with a plurality of electronic devices, such as mobile phones, for providing input of an event poster and communicating posts from responders.

As shown in FIG. 8, an exemplary witness request and alert notification and tracking system 10 utilizes an internet system 40 comprising a database 41 that is wirelessly connected with a plurality of electronic devices 20, such as mobile devices 22, including mobile phones 24, for providing an input of an event, such as an alert or witness request, and inputting posts, such as text posts 50, picture posts 54, and video posts 57 from responders. An exemplary database 41 comprises a control program 44 for operating the functions of the witness request and alert notification and tracking system 10 through the database 41, and data storage 46 for storing data regarding events including picture, video, and text posts. A global positioning system 48 of the mobile device 22 enables the database 41 to track the location of the users of the system and to provide alerts to users within an event range. The database 41 may use the location of the event poster as the event location or the user may input a location of the event. For example, a user may flee the scene of a dangerous event, such as a fire or chemical spill, and may then later input the location of the event to warn others to keep away from that area.

Figure 9:
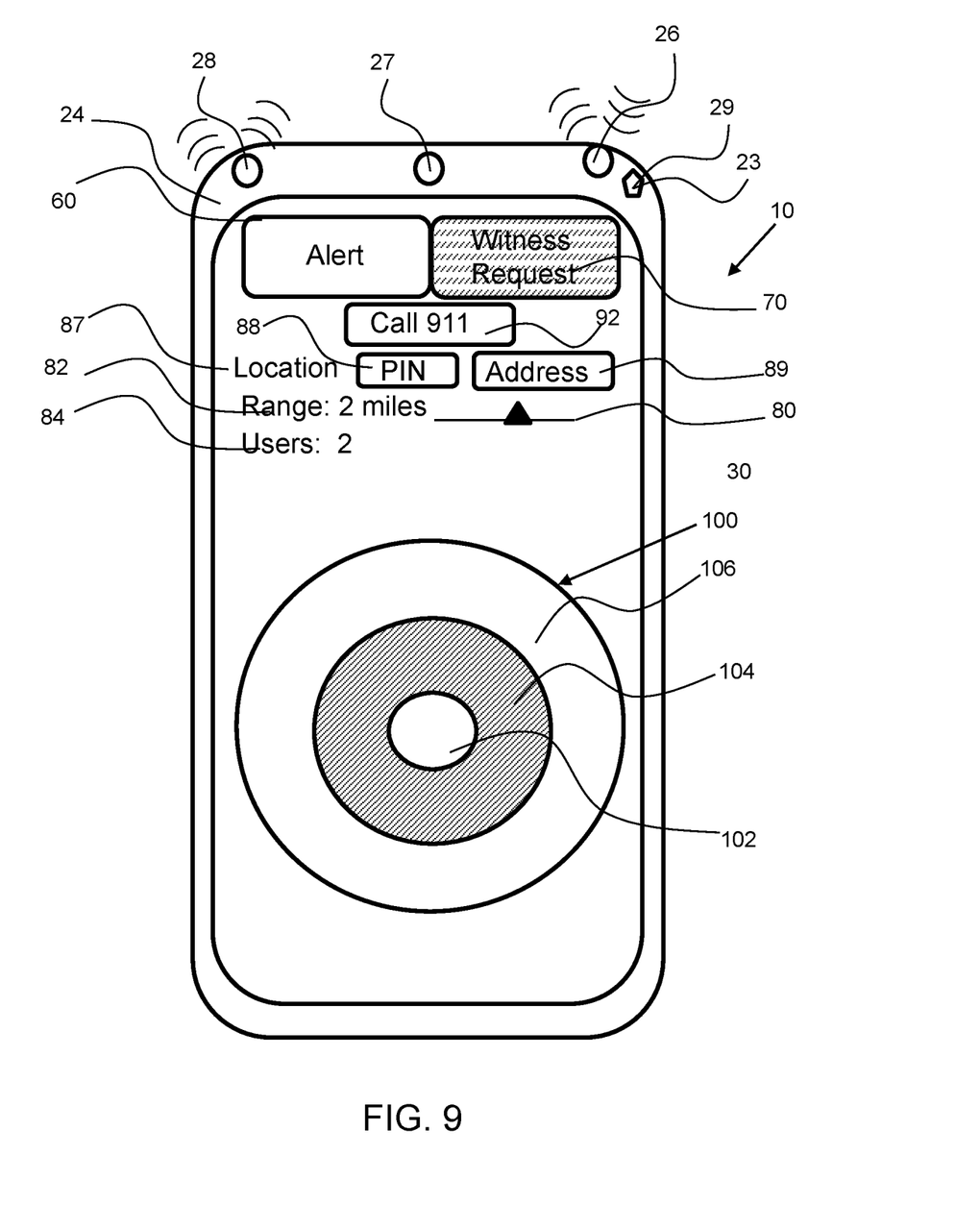
FIG. 9 shows a screen shot of an event poster's mobile device having a group selection input feature.

As shown in FIG. 9, an event poster's mobile device has a group selection input feature 100 comprising a defined group selection 102, a community group selection 104, and a public group selection 106. An event poster may select the public group to include all of the users within the area range input 80 of two miles, including the users within the community group and the defined group. As shown however, the user has selected only the community group, as indicated by the shading. An event poster may use a community group selection when they are attending or leaving a community event to request a ride from one of the other community members. Note that an event poster may have any number of community groups and/or defined groups to select from and the selection may be in a list format versus concentric circles as shown.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A witness request and alert notification and tracking system comprising:
   a) a database comprising:
      i) a control program;
      ii) a computing device that runs said control program;
      iii) a wireless transceiver for receiving user input from a plurality of users;
      iv) data storage for storing said user input;
   wherein said user input is received and disseminated to other users;
   b) an event poster's electronic device and a responder's electronic device, each comprising:
      i) an application software program;
      ii) a controller that runs said application software program;
      iii) a wireless transceiver for receiving and sending information to said database;
      iv) a camera;
      v) an event posting feature allowing an event poster to post a witness request event and an alert event through said event poster's mobile device, said event posting feature comprising:
         an event location input to input an event location;
         a range input to input a range from the event location for notification of said event;
         an event description input to input a description of the witness request event or alert event;
         wherein the event is received on said responder's mobile device and wherein said responder's mobile device comprises responder input features comprising:
      vi) a response confirmation input that allows a user to confirm that they will respond to said witness request event as a responder;
      vii) a responder posting feature for a responder to submit a responder post, said responder posting feature comprising:
         a responder text input to post a responder text;
         a responder picture input to post a responder picture;
         a responder video input to post a responder video;
      viii) a map display that displays said event location and system user icons;
      wherein the responder can respond to the event system via at least one of the responder posting features and wherein said responder's post is displayed on an event log.

2. The witness request and alert notification and tracking system of claim 1, wherein the event location input comprises a pin input, whereby the user can set the event location as location of the event poster and event poster's electronic device.

3. The witness request and alert notification and tracking system of claim 1, wherein the event location input comprises an address input feature allowing the event poster to input an address as the event location.

4. The witness request and alert notification and tracking system of claim 1, further comprising a captured user quantity, a quantity of users within the range input, that is displayed on the event poster's electronic device.

5. The witness request and alert notification and tracking system of claim 1, wherein the range input comprises a sliding bar input to change the range.

6. The witness request and alert notification and tracking system of claim 5, further comprising a captured user quantity, a quantity of users within the range input, that is displayed on the event poster's electronic device.

7. The witness request and alert notification and tracking system of claim 1, wherein the system user icons comprise an event poster icon and responder icons.

8. The witness request and alert notification and tracking system of claim 7, wherein responder icons is different from non-responding user icons.

9. The witness request and alert notification and tracking system of claim 1, comprising an event log of responder posts.

10. The witness request and alert notification and tracking system of claim 1, comprising a 911 call feature that automatically dials 911.

11. The witness request and alert notification and tracking system of claim 1, wherein the responder picture input automatically opens a picture function of the responder's electronic device to allow the responder to capture said responder picture.

12. The witness request and alert notification and tracking system of claim 1, wherein the responder's picture is automatically posted on an event log on all users' electronic devices within said range.

13. The witness request and alert notification and tracking system of claim 1, wherein the responder video input automatically opens a video function of the responder's electronic device.

14. The witness request and alert notification and tracking system of claim 13, wherein the responder's video is automatically posted on an event log on all users' electronic devices within said range.

15. The witness request and alert notification and tracking system of claim 1, wherein the event poster's electronic device is a mobile device and wherein the responder's electronic device is a mobile device.

16. The witness request and alert notification and tracking system of claim 1, further comprising a defined group selection input for selection by the event poster, wherein the defined group is a set of defined users selected by the event poster, and wherein the event will be sent only to the set of defined users.

17. The witness request and alert notification and tracking system of claim 1, further comprising a community group selection input for selection by the event poster, wherein the community group is a set of users registered under a community group by the witness request and alert notification and tracking system, and wherein the event will be sent only to the community group.

18. A witness request and alert notification and tracking system comprising:
   a) a database comprising:
      i) a control program;
      ii) a computing device that runs said control program;
      iii) a wireless transceiver for receiving user input from a plurality of users;
      iv) data storage for storing said user input;
      wherein said user input is received and disseminated to other users;
   b) an event poster's mobile device and a responder's mobile device, each comprising:
      i) an application software program;
      ii) a controller that runs said application software program;
      iii) a wireless transceiver for receiving and sending information to said database;
      iv) a camera;
      v) an event posting feature allowing an event poster to post a witness request event and an alert event through said event poster's mobile device, said event posting feature comprising:
         an event location input to input an event location comprising:
            a pin input that sets the event location as the location of the event poster's mobile device; and
            an address input feature allowing the event poster to input an address as the event location;
         a range input to input a range from the event location for notification of said event;
         an event description input to input a description of the witness request event or alert event;
         a captured user quantity, a quantity of users within the range input, that is displayed on the event poster's mobile device;
      wherein the event is received on said responder's mobile device and wherein said responder's mobile device comprises responder input features comprising:
      vi) a response confirmation input that allows a user to confirm that they will respond to said witness request event as a responder;
      vii) a responder posting feature for a responder to submit a responder post, said responder posting feature comprising:
         a responder text input to post a responder text;
         a responder picture input to post a responder picture;
         a responder video input to post a responder video;
      viii) a map display that displays said event location and system user icons;
      ix) an event log of responder posts;
      wherein the responder can respond to the event system via at least one of the responder posting features and wherein said responder's post is displayed on an event log;
      wherein the system user icons comprise an event poster icon and responder icons;
      wherein responder icons are different from non-responding user icons.

19. The witness request and alert notification and tracking system of claim 18, further comprising a defined group selection input for selection by the event poster, wherein the defined group is a set of defined users selected by the event poster, and wherein the event will be sent only to the set of defined users.

20. The witness request and alert notification and tracking system of claim 18, further comprising a community group selection input for selection by the event poster, wherein the community group is a set of users registered under a community group by the witness request and alert notification and tracking system, and wherein the event will be sent only to the community group.

* * * * *